United States Patent
Theriault et al.

(10) Patent No.: US 7,599,138 B2
(45) Date of Patent: Oct. 6, 2009

(54) ADJUSTABLE OPTICAL MOUNTING

(75) Inventors: Philip Christopher Theriault, Tucson, AZ (US); Anthony O. Lee, Tucson, AZ (US); Christopher A. Roth, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 718 days.

(21) Appl. No.: 10/968,609

(22) Filed: Oct. 19, 2004

(65) Prior Publication Data

US 2006/0081745 A1 Apr. 20, 2006

(51) Int. Cl.
*G02B 7/02* (2006.01)

(52) U.S. Cl. .................. 359/819; 359/811; 359/822

(58) Field of Classification Search ........... 359/819, 359/813, 811, 822, 823
See application file for complete search history.

(56) References Cited

U.S. PATENT DOCUMENTS

| | | | |
|---|---|---|---|
| 4,701,607 A * | 10/1987 | El-Hanany et al. | 250/205 |
| 4,763,991 A | 8/1988 | Klotz, Jr. et al. | |
| 5,003,401 A * | 3/1991 | Otsuka | 348/374 |
| 6,478,434 B1 | 11/2002 | Streetman et al. | |
| 2003/0193621 A1 | 10/2003 | Duggan et al. | |
| 2004/0008429 A1* | 1/2004 | Watson et al. | 359/819 |

FOREIGN PATENT DOCUMENTS

| | | | |
|---|---|---|---|
| JP | 08-201938 | * | 1/1995 |
| JP | 07-1815388 | * | 7/1995 |
| JP | 08-201938 | | 8/1996 |
| JP | 2005-173249 | * | 12/2003 |

* cited by examiner

*Primary Examiner*—Jessica T Stultz
*Assistant Examiner*—Brandi N Thomas
(74) *Attorney, Agent, or Firm*—Renner, Otto, Boisselle & Sklar, LLP

(57) ABSTRACT

An adjustable optical mounting includes a mounting support or frame, and multiple adjusters to provide a six-degree-of-freedom adjustment of the support relative to a base. The adjusters include cams with cam surfaces that bear against and engage slots in the support or frame, to translate the support in directions parallel to the base. In addition, threaded devices and resilient (compliant) devices such as springs are utilized to adjust the height of the support relative to the base, at multiple locations. The cams and the threaded devices of the adjusters may be independently adjusted to translate the support relative to the base, and/or to change the height and/or tilt angle of the support.

41 Claims, 14 Drawing Sheets

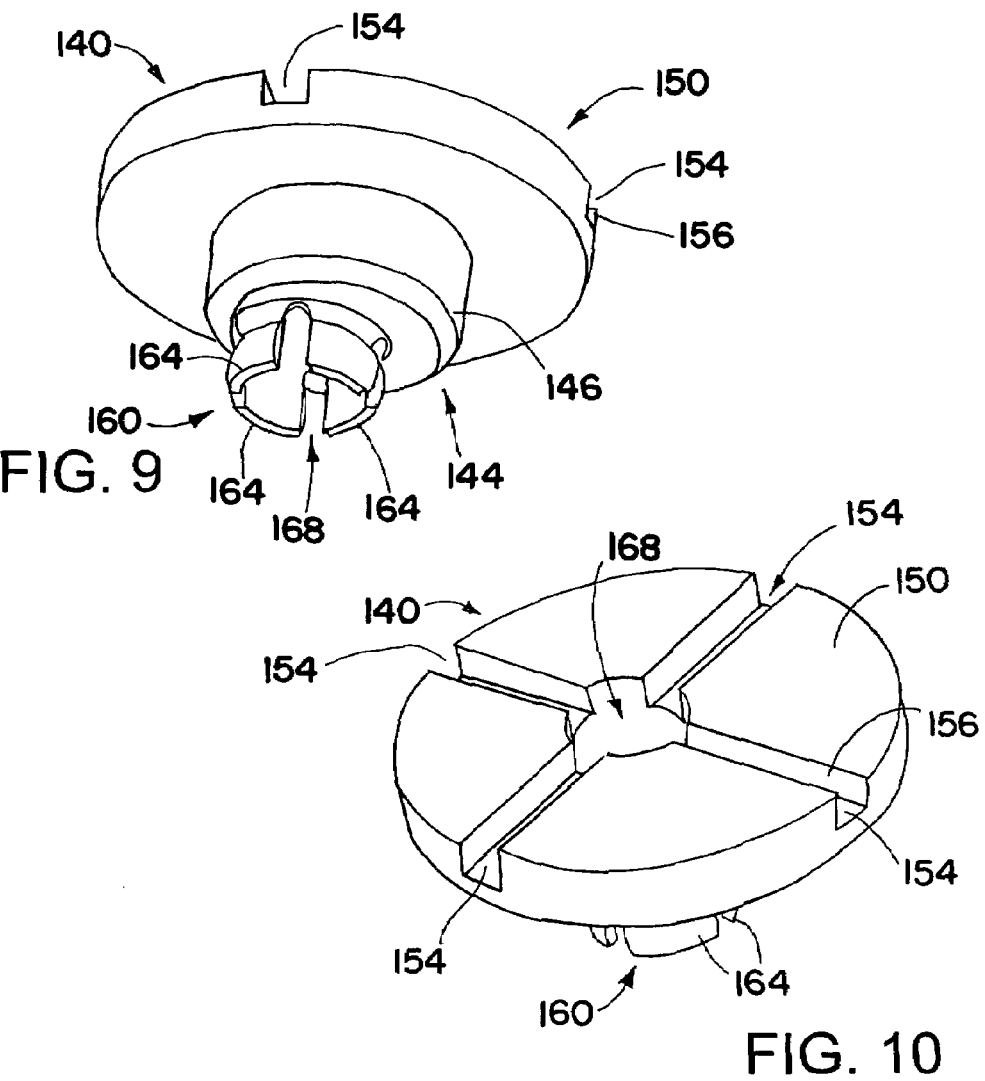
FIG. 9
FIG. 10
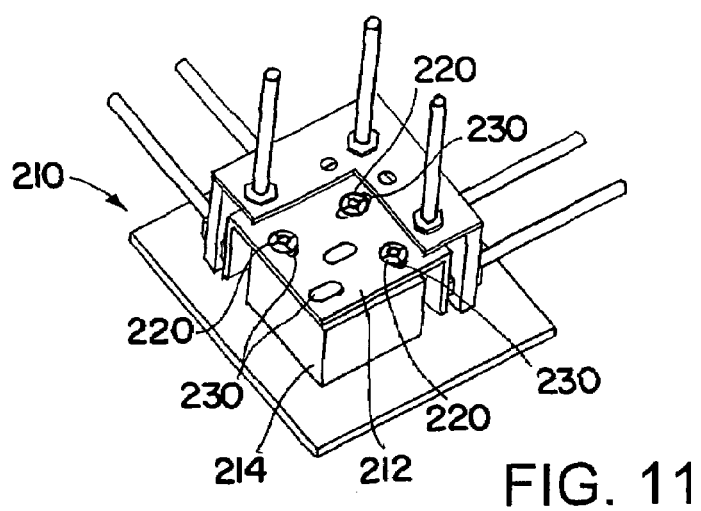
FIG. 11

ADJUSTABLE OPTICAL MOUNTING

BACKGROUND OF THE INVENTION

1. Technical Field

The invention relates generally to adjustable systems for mounting devices, such as optical devices.

2. Background of the Related Art

Position adjustment of optical detectors in six degrees of freedom is currently accomplished by insertion of shims between an optical bench and a detector assembly. This process may be complex and time consuming. First a nominal shim is installed to position the detector in a nominally correct position. The entire sensor is assembled and extensive sensor characterization is performed. This testing indicates where the detector should be relative to where it was initially located. Then the sensor is completely disassembled and the shims of each detector are changed to a different thickness, as indicated by the prior test results. The sensor is then re-assembled and the cycle of testing is repeated. Multiple cycles are often required to achieve desired sensor position. In systems run at cryogenic temperatures, forces acting on the detectors change during each iteration of the process, and slight changes in optical alignment may occur as a result. Thus, the current process may be extensive and time consuming. It will be appreciated from the foregoing that improvements in optical mounting would be desirable.

SUMMARY OF THE INVENTION

According to an aspect of the invention, an adjustable optical mounting includes: a base; a support configured to receive at least one optical device; and plural adjusters having respective cams that include eccentric cam surfaces that are mechanically coupled to the support. Rotation of the cams causes translation of the support relative to the base. The optical mounting may also have threaded fasteners, such as screws, that may be adjusted to effect translation and/or rotation of the support relative to the base.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, which are not necessarily to scale:

FIGS. 9 and 10 are bottom oblique and top oblique views, respectively, of a cam of the optical mounting of FIG. 2;

FIGS. 11 and 12 are oblique views of a second embodiment of an optical mounting in accordance with the present invention;

DETAILED DESCRIPTION

An adjustable optical mounting includes a mounting support or frame, and multiple adjusters to provide a six-degree-of-freedom adjustment of the support relative to a base. The adjusters include cams with cam surfaces that bear against and engage slots in the support or frame, to translate the support in directions parallel to the base. In addition, threaded devices and resilient (compliant) devices such as springs are utilized to adjust the height of the support relative to the base, at multiple locations. The cams and the threaded devices of the adjusters may be independently adjusted to translate the support relative to the base, and/or to change the height and/or tilt angle of the support.

Figure 1:
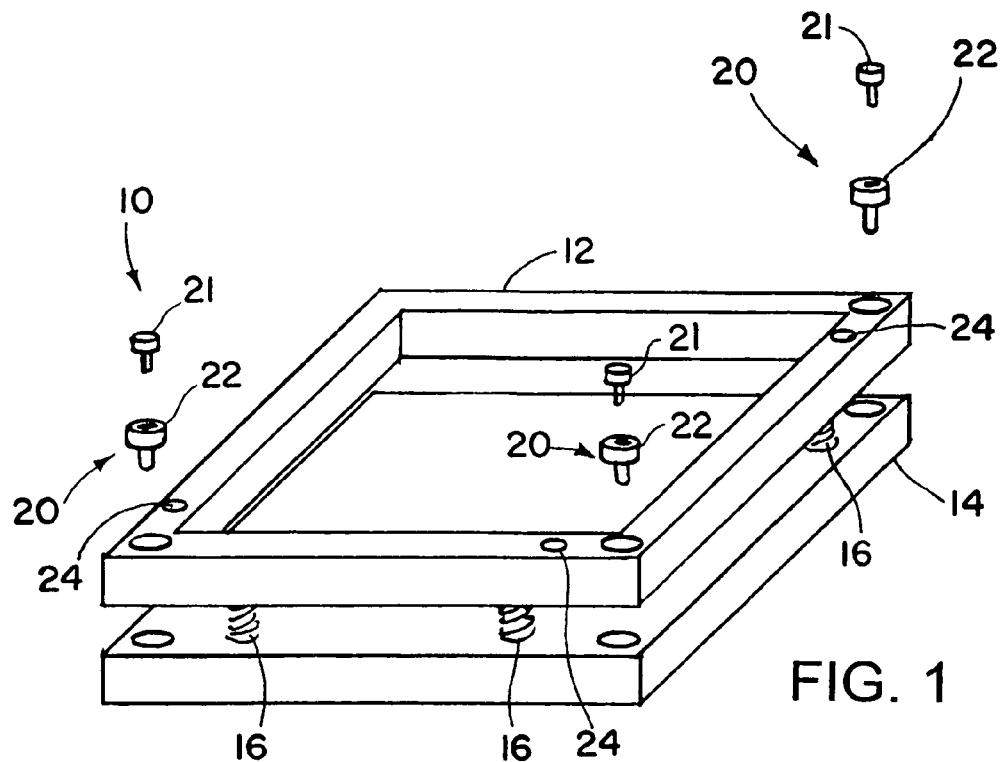
FIG. 1 is a conceptual diagram of an optical mounting in accordance with the present invention.
Figure 2:
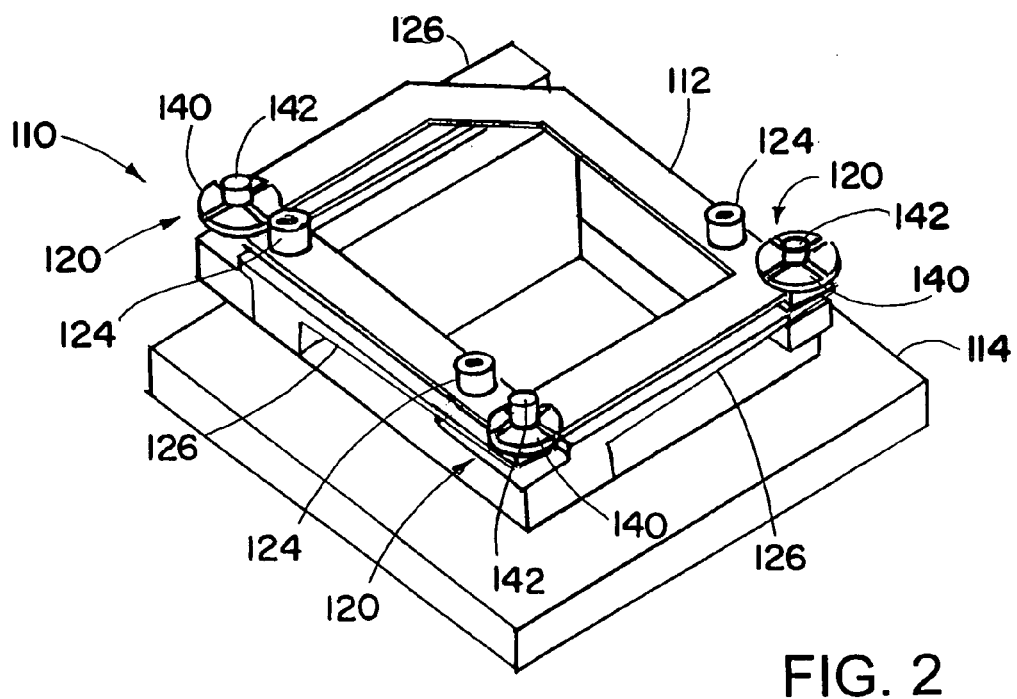
FIG. 2 is an oblique view of one embodiment of an optical mounting in accordance with the present invention.
Figure 3:
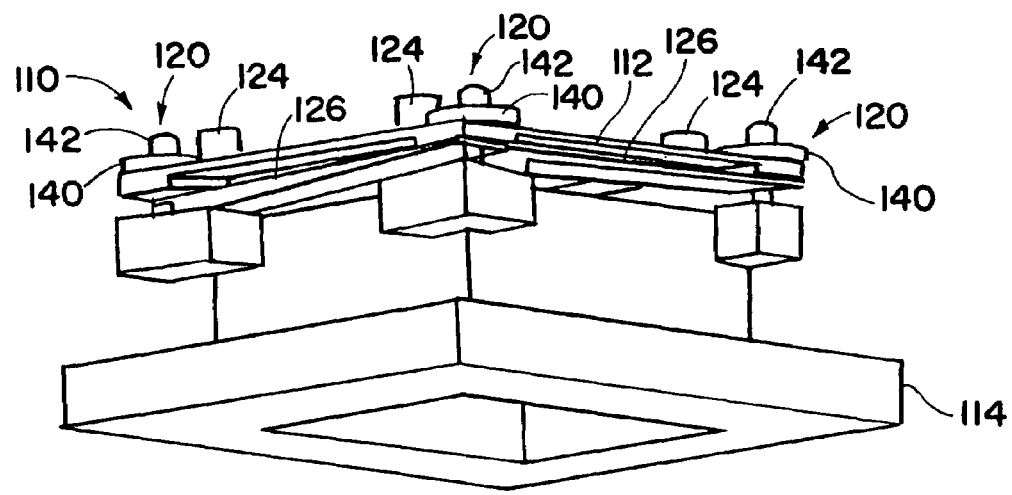
FIG. 3 is another view of the optical mounting of FIG. 2.

Referring initially to FIG. 1, an adjustable optical mounting 10 includes a support or frame 12 to which an optical device may be coupled. The support 12 may be adjustable relative to a base 14 in six degrees of freedom. The mounting 10 has resilient devices 16 which bias the support 12 to bear against upper surfaces of multiple adjusters 20. The adjusters 20 each include a threaded member 21 that is utilized to adjust the height of a part of the support 12 relative to the base 14. In addition, each of the adjusters 20 includes a cam member 22 with a cam surface that bears against a slot in the support 12. Turning of the adjusters 20 may cause rotation of the cam surfaces, resulting in translation of the support 12 in a direction or directions substantially parallel to the base 14. The support 12 includes mountings or mounting points 24 to facilitate mounting of an optical device to the support 12.

The optical mounting 10 shown in FIG. 1 provides an overall conceptual framework for the discussion of various specific embodiments discussed below. It will be appreciated that the various parts of the optical mounting 10 may take any of a variety of suitable forms, only some of which are discussed below. It will be further appreciated that the various forms of parts of an optical mounting that are discussed below may be combined in various suitable combinations.

FIGS. 2-6 show an optical mounting 110 that has three adjusters 120 for adjusting the position of a frame 112 in six degrees of freedom, relative to a base 114. The frame 112 has mounting points 124 for receiving an optical device which is mounted to the frame 112. The optical device may be mounted to the frame in any of a variety of suitable ways, such as by use of suitable threaded fasteners.

The base 114 includes base flexures 126, which are cantilever beams the free ends of which are coupled to the frame 112 at the points where the adjusters 120 pass through the frame 112. The base flexures 126 function as resilient devices to provide a spring force that pushes the frame 112 away from the base 114, in opposition to the adjusters 120. The base flexures 126, being a continuous, unitary part of the base 114 as a single piece of material, advantageously provide good thermal conductivity with the base 114. Good thermal conductivity between the frame 112 and the base 114 may be a desirable characteristic of the optical mounting 110, especially in view of the cryogenic temperatures that may be used for optical systems. For optical systems with parts at cryogenic temperatures, conducting away heat generated by operating parts may be an important concern. Nonetheless, it will be appreciated that alternatively other sorts of resilient devices may be utilized to provide a bias force pushing the frame 112 away from the base 114.

Figure 4:
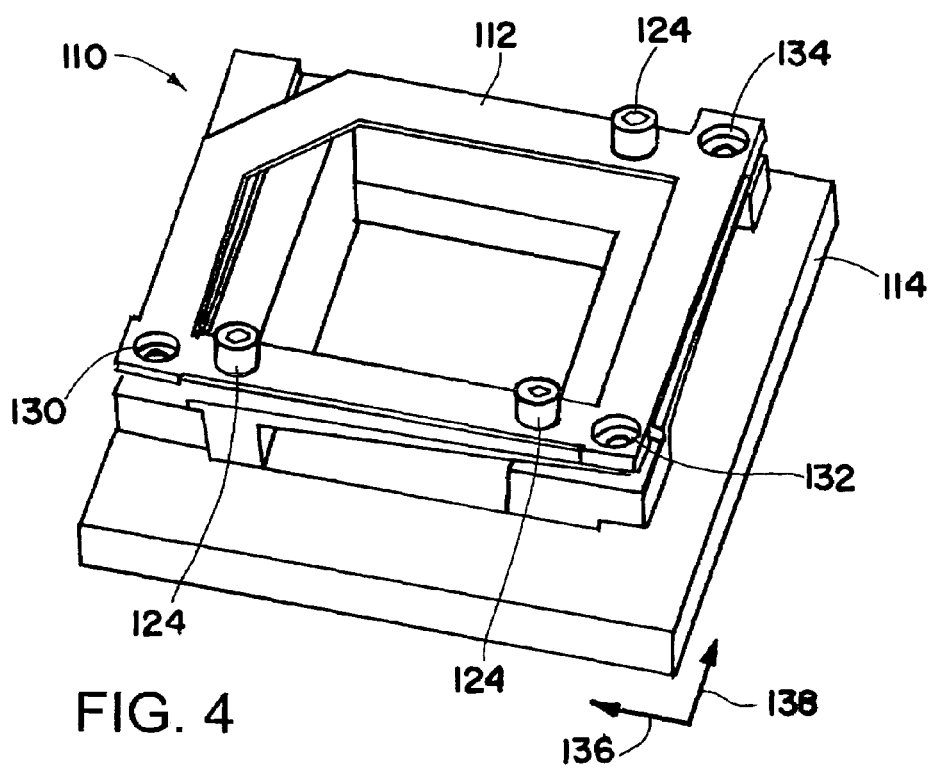
FIG. 4 is another oblique view of the optical mounting of FIG. 2, with the adjusters removed to show positions of the slots on the frame.
Figure 5:
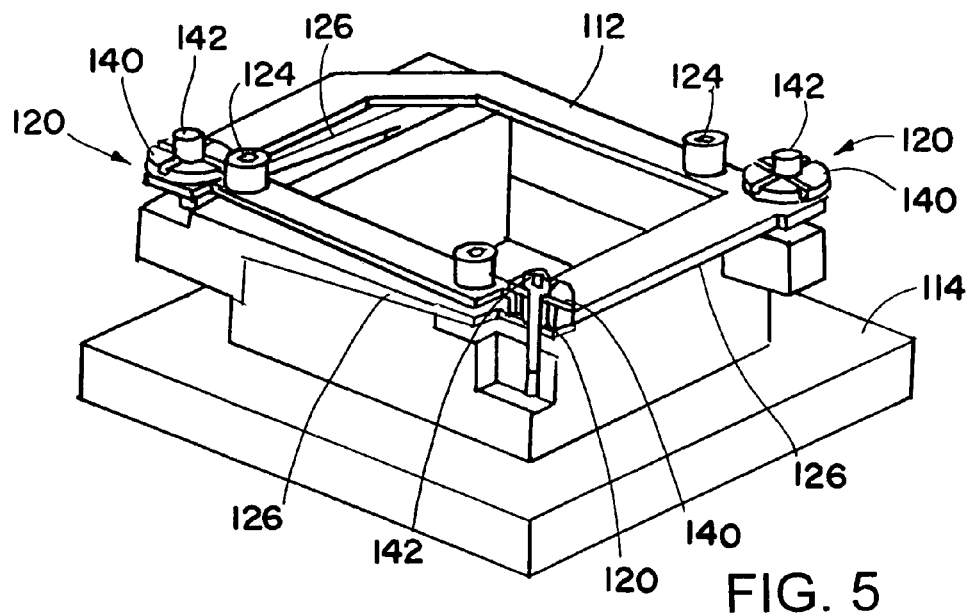
FIG. 5 is a partially cutaway view of the optical mounting of FIG. 2.
Figure 6:
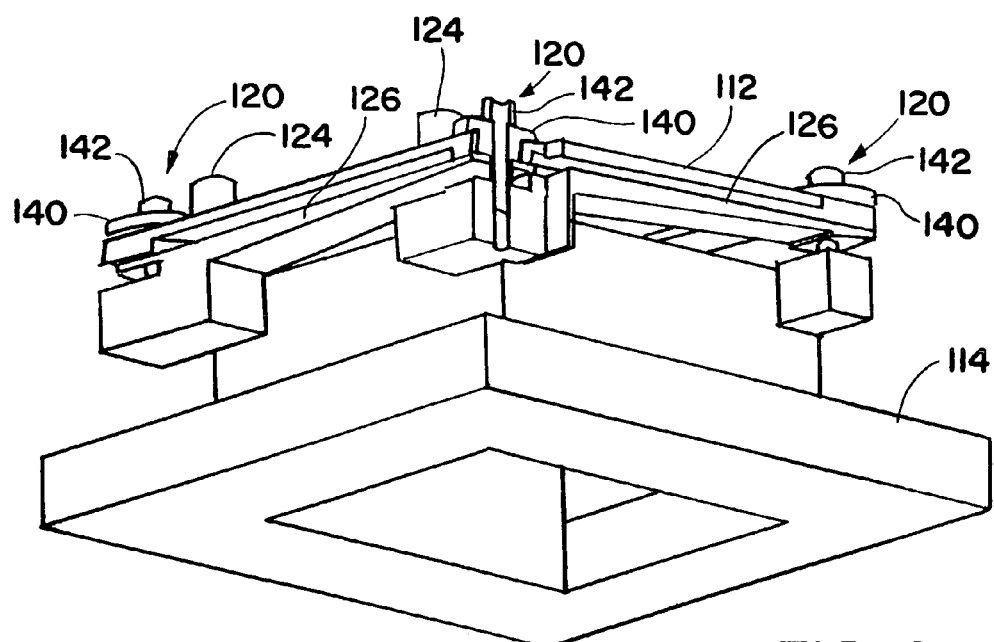
FIG. 6 is another partially cutaway oblique view of the optical mounting of FIG. 2.
Figure 7:
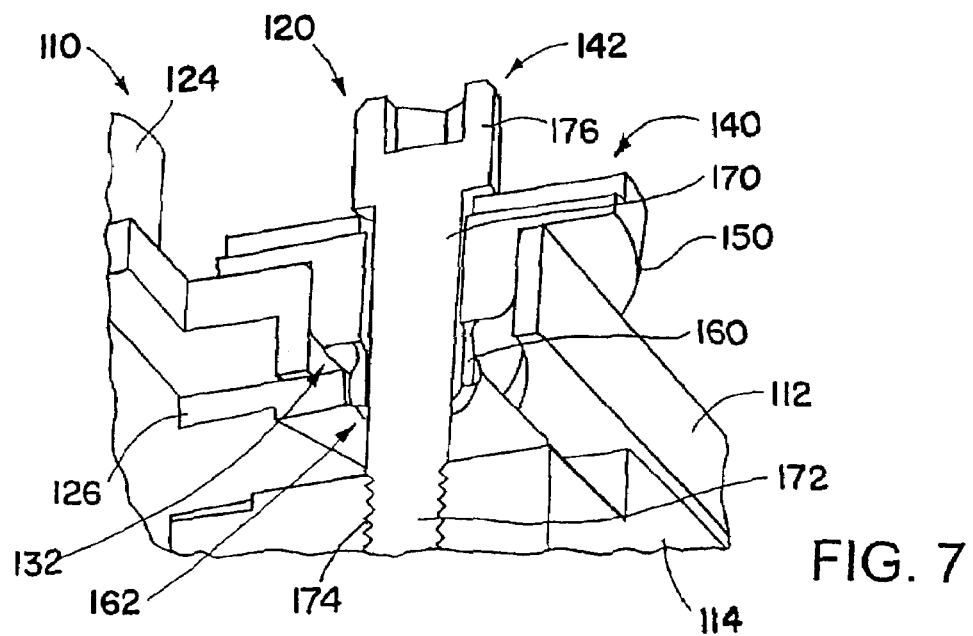
FIGS. 7 and 8 are partially cutaway detailed views of the configuration and location of the adjusters of the optical mounting of FIG. 2.
Figure 8:
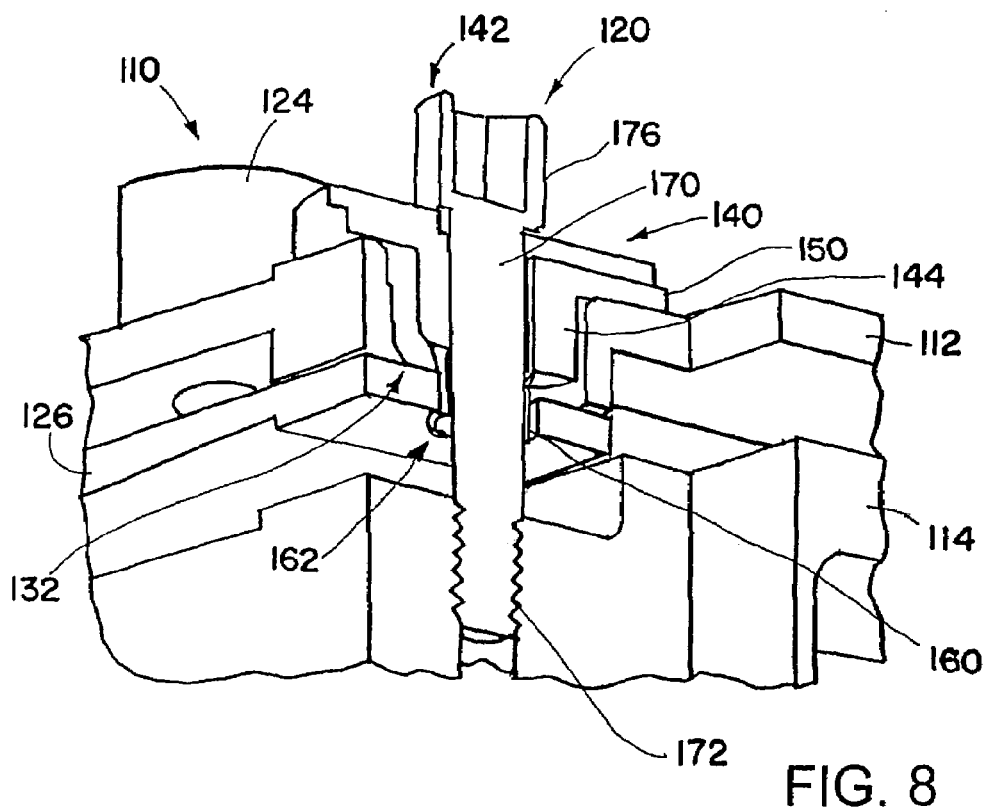
Figure 12:
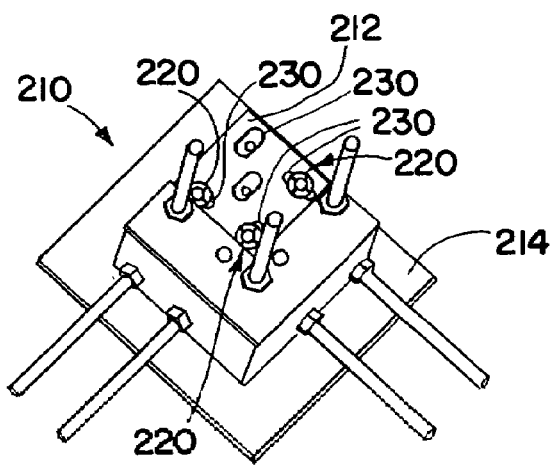
Figure 13:
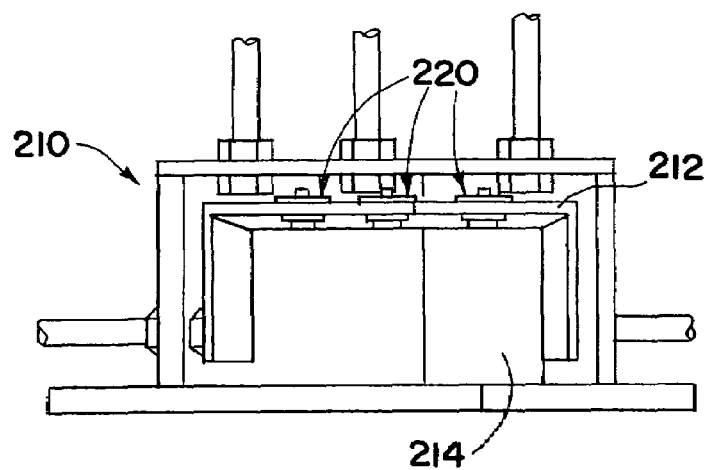
FIG. 13 is a side view of the optical mounting of FIG. 11.
Figure 14:
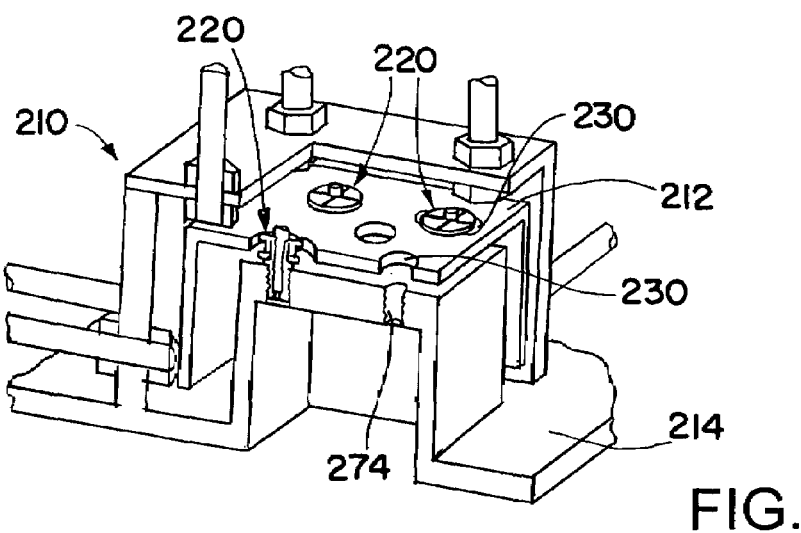
FIG. 14 is a partially cutaway view of the optical mounting of FIG. 11.
Figure 15:
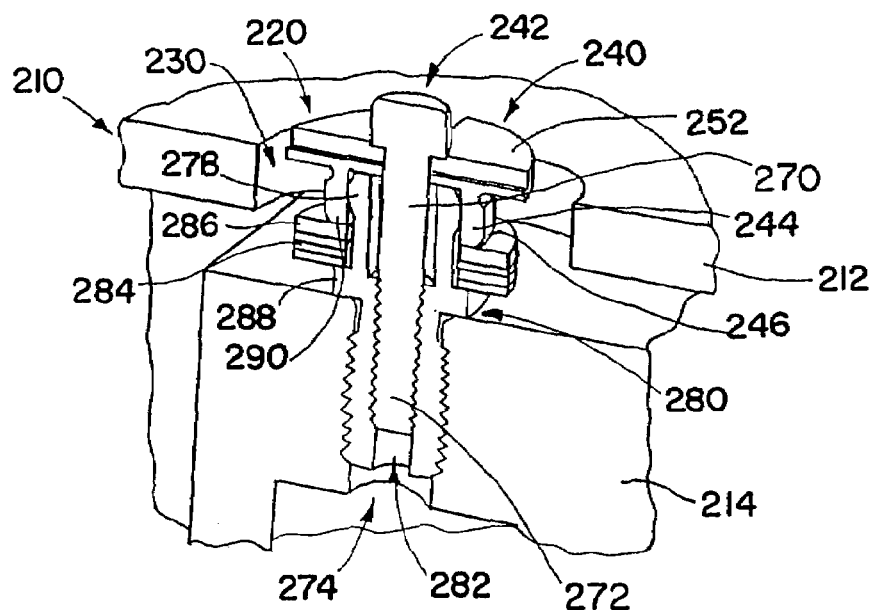
FIG. 15 is a detailed view of a portion of the partially cutaway view of FIG. 14, illustrating the components in operation of the adjusters.
Figure 16:
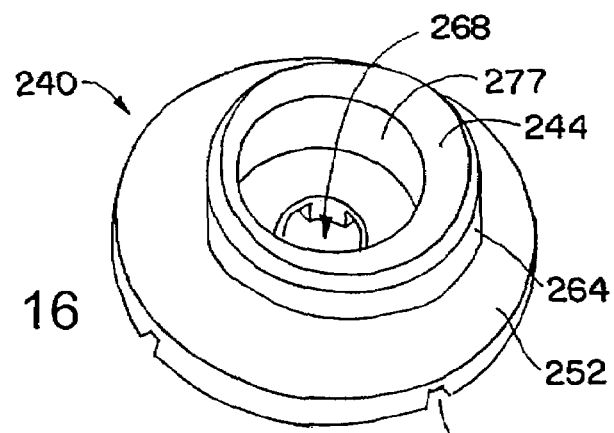
FIGS. 16 and 17 are oblique views of a cam used with the optical mounting of FIG. 11.
Figure 17:
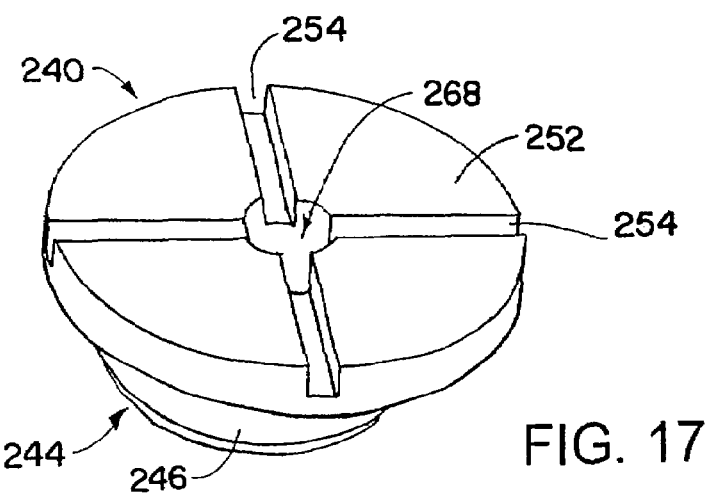
Figure 18:
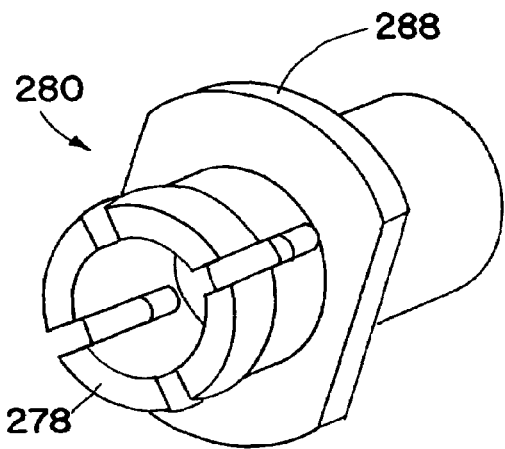
FIGS. 18 and 19 are oblique views showing various aspects of a post used with the optical mounting used in FIG. 11.
Figure 19:
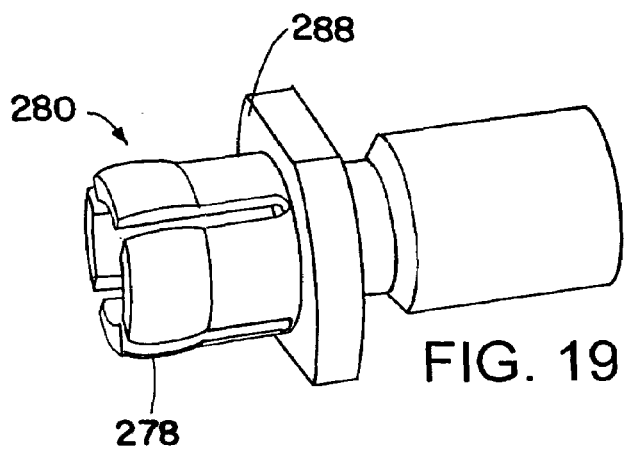

As best seen in FIG. 4, the frame 112 includes elongate slots 130, 132, and 134, for receiving the adjusters 120. Walls of the slots 130, 132, and 134 bear against eccentric cam surfaces of the adjusters 120. Rotation of portions of suitable of the adjusters 120 causes a shifting and reorientation of the eccentric cam surfaces bearing on the slots 130-134, resulting in translation of the frame 112 relative to the base 114. The slots 130 and 134 are elongate in a first direction 136, which allows rotation of the cam surfaces in the slots 130 and 134 to translate the frame 112 in a second direction 138. The slot 132 is elongate in the second direction 138, allowing rotation of the eccentric cam surface in the slot 132 to translate the frame 112 in the first direction 136. More generally, one of the slots may be elongate in a direction at an angle to the elongate direction of one or more of the other slot(s). The angle between the elongation directions may be orthogonal or non-orthogonal, although it will be appreciated that orthogonal directions may make for easier adjustments.

With reference now in addition to FIGS. 7-10, details of the adjuster 120 are discussed. The adjuster 120 includes a cam 140 and a screw 142. The cam 140 is located in the slot 132 with an eccentric cam surface 146 of a cam surface portion 144 bearing against walls of the slot 132. The cam 140 includes a cam head 150 having cam slots 154 therein. The cam slots 154 are engaged by a suitable tool in order to turn the cam 140. One or more of the cam slots 154 may be marked to allow visual or other determination of the orientation of the cam surface 146. For example, one of the cam slots 154 may be colored, such as by a stripe 156, to indicate the long side of the cam surface 146, that is, the side of the cam surface 146 which deviates most in distance from the axis of the cam 140.

The cam 140 has a cam flexure 160 for securely engaging sides of a base flexure hole 162 in the base 114. The cam flexure 160 may include a number of resilient arms 164 that are configured to flex inward to enter the base flexure hole 162, and are configured to press outward against sides of the base flexure hole 162, to thereby secure the cam 160 solidly within the base flexure hole 162. This securement of the resilient cam flexure 160 within the base flexure hole 162 prevents undesirable relative movements of the cam 140 relative to the base flexure 126. It will be appreciated that the securement coupling between the cam 140 and the base flexure 126 may aid in being able to precisely orient the frame 112 relative to the base 114. Any gaps or tolerance ("slop") between the cam 140 and the base flexure 126 would reduce the precision with which the frame 112 may be oriented relative to the base 114.

The cam 140 also has a central hole 168. The eccentric cam surface 146 is eccentrically located relative to the central hole 168. That is, the cam surface is not axisymmetrically located relative to the central hole 168. Therefore, rotation of the cam 140 about the central hole 168 reorients the cam surface 146. The cam flexure 160 however, is axisymmetrically located about the central hole 168.

A screw shaft 170 of the screw 142 passes through the central hole 168. The shaft 170 has a threaded portion 172 which engages an internally threaded hole 174 in the base 114. By turning a screw head 176, the screw 142 may be moved up and down. Spring forces from the base flexure 126 press the frame 112 and the cam 140 up against the screw head 176. Thus turning the screw 142 adjusts the height of the frame 112 relative to the base 114.

This height adjustment is available for all of the adjusters 120 that mechanically couple the frame 112 to the base 114. Thus, the height of the frame 112 relative to the base 114 may be adjusted at three separate locations. The overall height of the frame 112 relative to the base 114 may thus be adjusted. Also, the tilt angle between the frame 112 and the base 114 may be adjusted. Along with the translation adjustments in directions 136 and 138, the adjusters 120 thus allow a six-degree-of-freedom adjustment of the frame 112 relative to the base 114. These adjustments may be effected by the rotation of the two independent parts of each of the adjusters 120, the cam 140 and the screw 142.

In an example embodiment, the cam portions 146 of the cams 140 may have a diameter that is less than about 5 mm (0.2 inches). However, it will be appreciated that the size of the adjusters 120 may vary widely. The accuracy of the optical mounting 110 (accuracy of positioning the frame 112 relative to the base 114) may be within about 0.013 mm (0.0005 inches).

FIGS. 11-14 show an optical mounting 210 for use in locating a support or platform 212 relative to a base 214. Three adjusters 220 are used to adjust the position of the base 214 relative to that of the frame 212. The adjusters 220 include cams 240 for engaging slots 230 in the frame 212. The adjusters 220 also include screws 242 for adjusting the height of at least portions of the frame 212, relative to the base 214.

Referring now in addition to FIGS. 15-19, details of the adjusters 220, and their interaction with the frame 212 and the base 214, are discussed. The cam 240 includes many parts that correspond to those of the cam 140, such as a cam head 252 with slots 254 therein, and a cam surface portion 244 with an outer cam surface 246 eccentrically mounted about a central hole 268. The cam surface portion 244 includes an inner opening 277 for receiving a flexure portion 278 of a post 280 that is mounted in a hole 274 in the base 214. The flexure portion 278 of the post 280 serves to provide a low-hysteresis coupling between the post 280 and the cam 240. The post 280 may be press-fit into the hole 274. The post 280 has an internally threaded hole 282 for engaging a threaded portion 272 of a shaft 270 of the screw 242.

Resilient force to bias the frame 212 to bear upward against the cam head 252 is provided by disk springs 284. The disk springs or spring washers 284 are located between a load distributor or washer 286, and a protruding ledge 288 of the post 280. The ledge 288 also serves as a stop for insertion of the post 280 into the base hole 274. The load distributor 286 bears against a bottom surface 290 of the cam surface portion 244.

The adjusters 220 may be utilized in a manner similar to that of the adjusters 120 described above. That is, the cams 240 may be rotated to translate the frame 212 relative to the base 214 and the screws 242 may be turned to adjust the height of portions of the frame 212 relative to the base 214.

Figure 20:
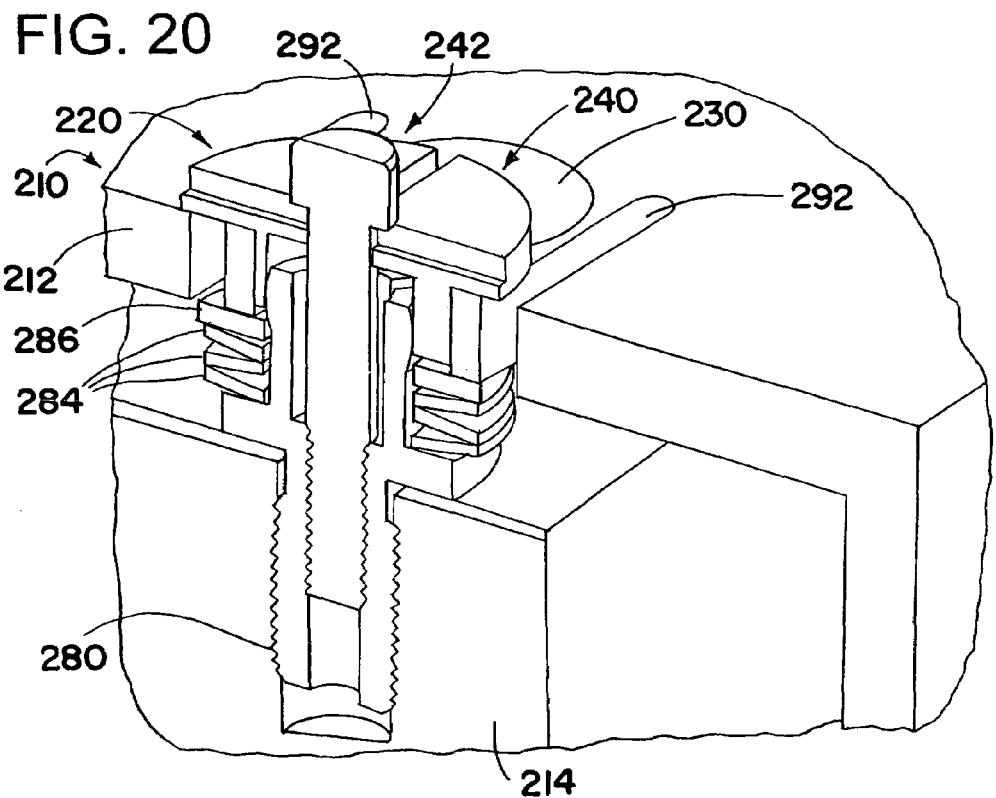
FIG. 20 is a partially cutaway oblique view showing an alternate embodiment optical mounting that utilizes relief slots in the frame or support.

FIG. 20 shows a variation on the optical mounting 210, with secondary relief slots 292 provided alongside the slots 230 in the frame 212. The relief slots 292 allow some outward flexure of the walls of the slot 230 in the direction in which the cam surfaces 246 bear on the slots 230. The relief slots 292 allow for less stringent tolerances in manufacture of the cam surfaces 246 and the slots 230.

Figure 21:
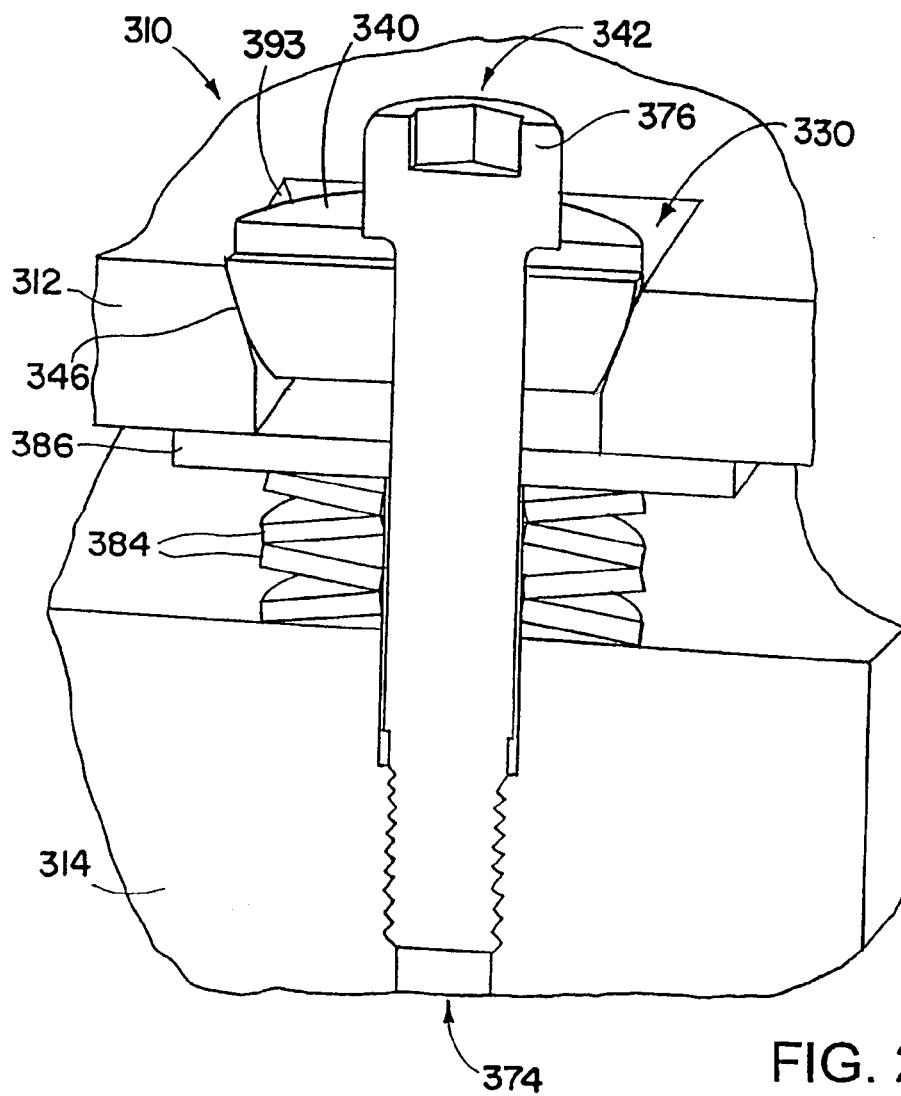
FIG. 21 is a partially cutaway oblique view showing an alternate embodiment optical mounting that uses a cam with a curved surface, which mates with a slot having a sloped surface.
Figure 22:
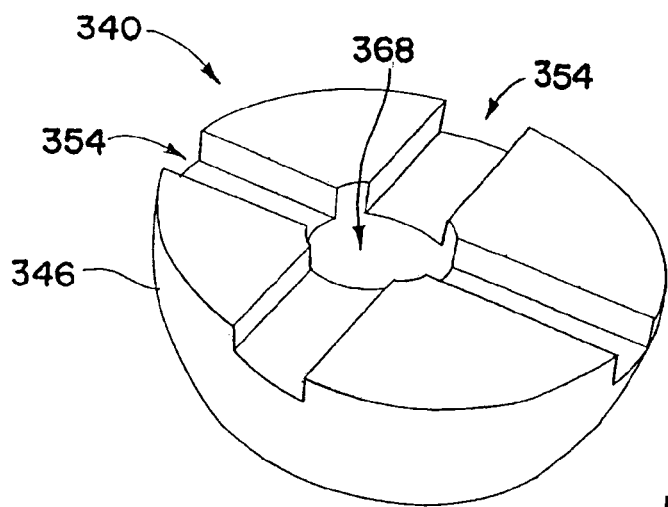
FIG. 22 is an oblique view of the cam of the optical mounting of FIG. 21.

FIGS. 21 and 22 show an optical mounting 310 that employs a cam 340 that has an eccentric cam surface 346 that is curved in more than one direction. That is, besides being curved (eccentrically) about an axis of a central hole 368 of the cam 340, the cam surface 346 is also curved in the direction of the central hole axis so as to make, for example, a spherical surface. The cam surface 346 engages a sloped slot 330. The cam 340 may be turned to allow different portions of the curved cam surface 346 to engage the sloped portions 393 of the slot 330, thereby causing translation of the frame 312 relative the base 314.

In a manner similar to that of other embodiments discussed above, a screw 342 is used to change the height of the frame 312 relative to the base 314, by threading the screw 342 further into or out of a threaded hole 374 in the base 314. A set of disk springs 384 bear against the base 314, and against a load distributor or washer 386. The load distributor 386 in turn bears against the frame 312, pressing the frame 312 and the cam 340 upward against a head 376 of the screw 342. As with other embodiments, the screw 342 and the cam 340 may be adjusted separately. The screw 342 may be adjusted by inserting a suitable wrench, such as an Allen wrench or hex key into a recess in the screw head 376. The cam 340 may be turned by using a suitable tool to engage slots 354 in the cam 340.

Figure 23:
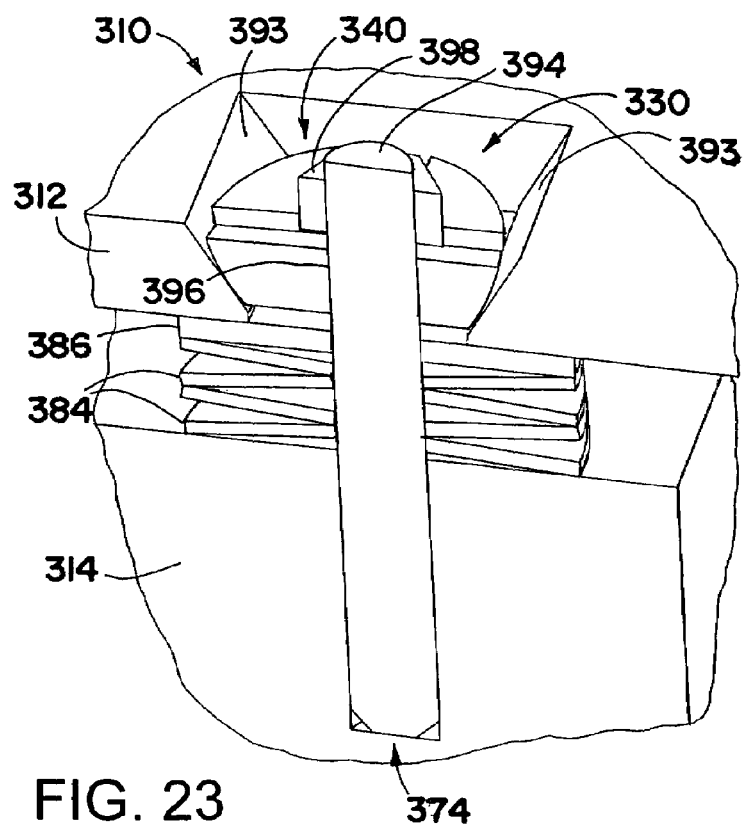
FIGS. 23 and 24 show oblique views of other alternate embodiments, utilizing nuts that are coupled to threaded sections of posts.
Figure 24:
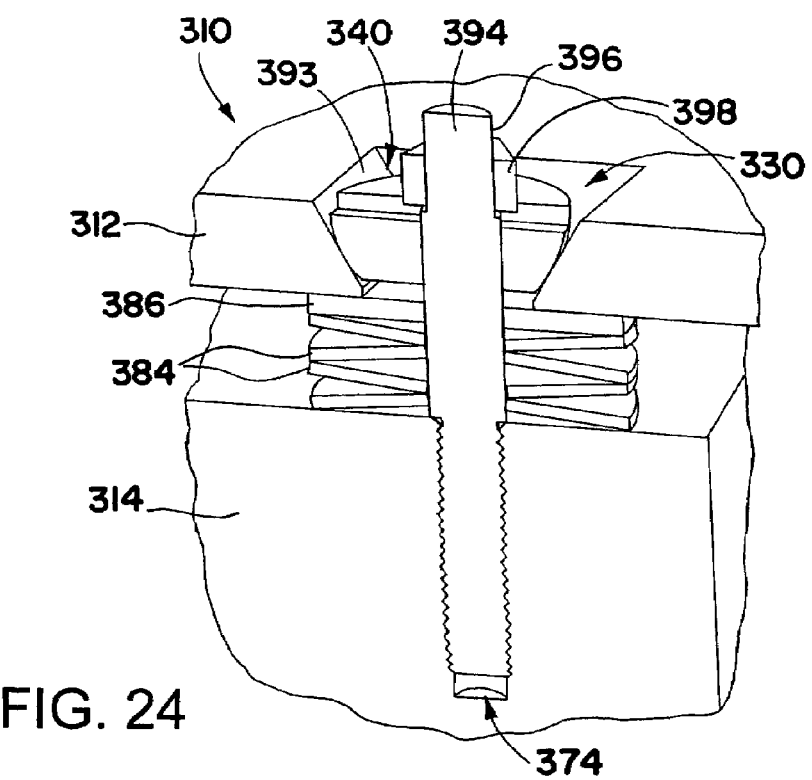

FIGS. 23 and 24 show alternative embodiments of the optical mounting 310 wherein a post 394 is either pressed into (FIG. 23) or screwed into (FIG. 24) a hole 374 in the base 314. The post 394 is secured to the base 314. The post 394 has a threaded upper portion 396 which is configured for receiving a nut 398. The nut 398 may be rotated to adjust the height of the frame 312 relative to the base 314.

Figure 25:
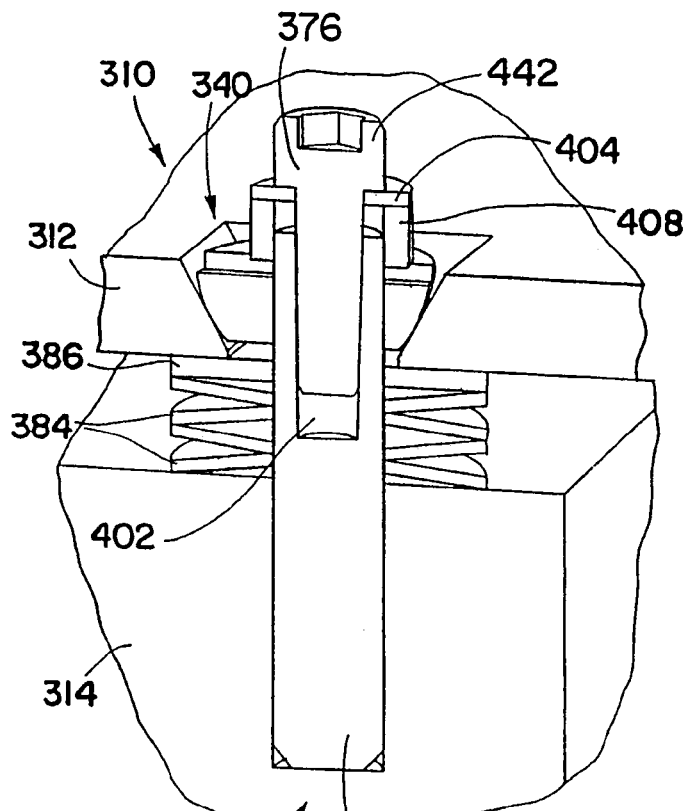
FIGS. 25, 26, 27, and 28 are partially cutaway oblique views showing other embodiments of a coupling between an adjuster, a frame, and a base, as part of an optical mounting of the present invention.
Figure 26:
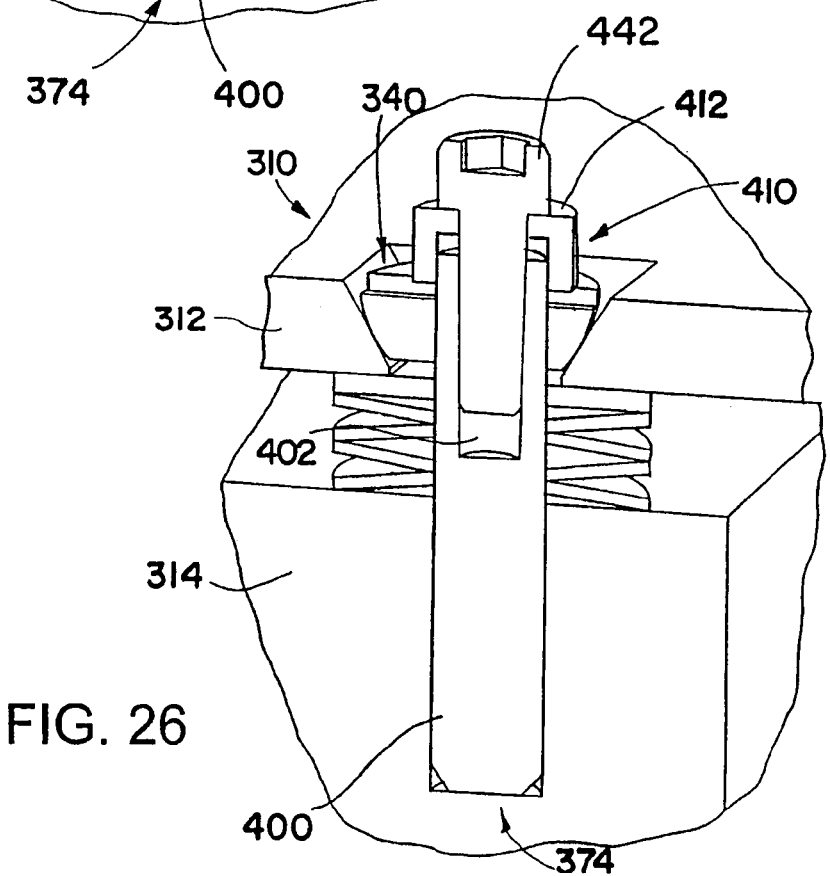

FIGS. 25-28 show further variations to the optical mounting 310, all of which involve a post 400 that has an internally threaded hole 402 for receiving a screw 442. The post 400 is secured to the base 314, either by being press fit or threadedly engaged into the base hole 374. As shown in FIG. 25, the screw head 376 may bear on a washer 404. The washer 404 in turn presses against a collar 408 that is in contact with the top surface of the cam 340. As shown in FIG. 26, the washer 404 and the collar 408 may be combined in a single collar 410 with a ledge 412.

Figure 27:
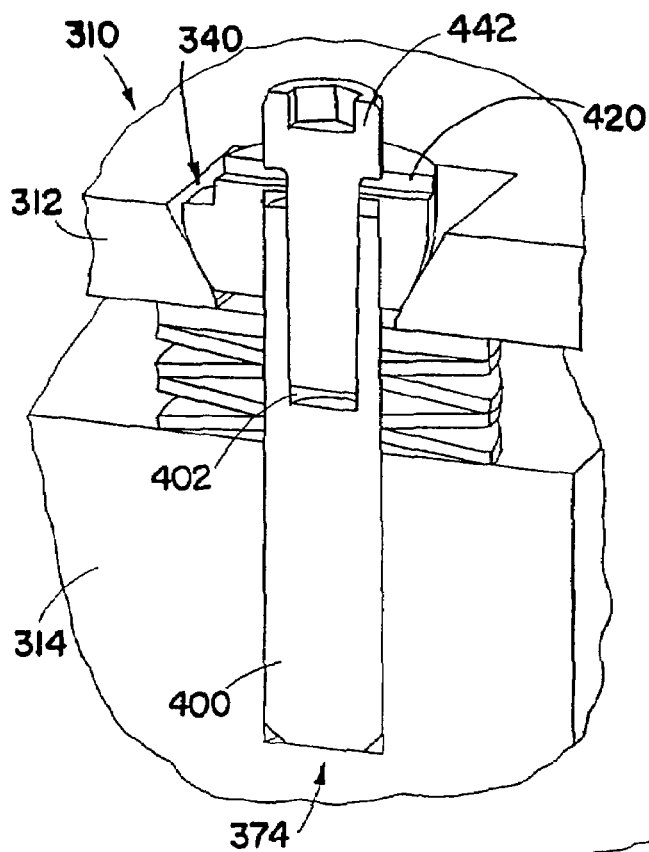
Figure 28:
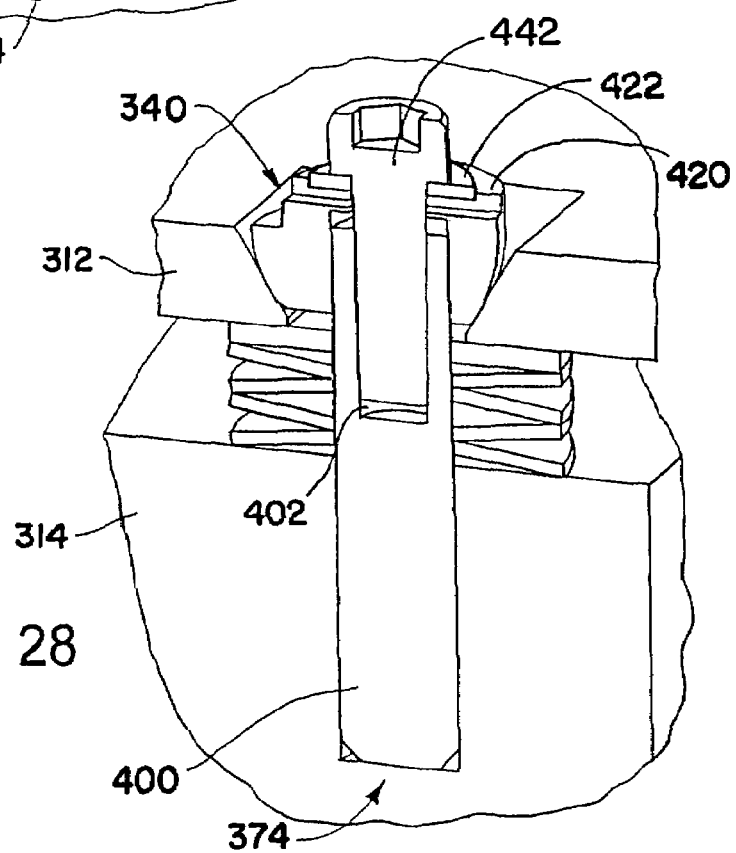
Figure 29:
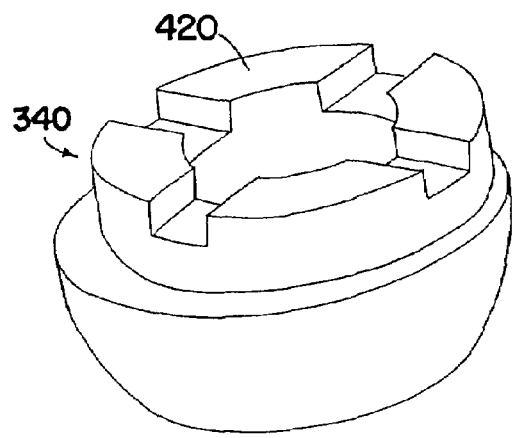
FIG. 29 is an oblique view of a curved cam utilized in the optical mountings of FIGS. 27 and 28.

With reference now in addition to FIG. 29, the cam 340 may have a raised portion 420 that serves at least some of the functions of the collars 408 and 410. The cam 340 with the raised portion 420 may be used to directly contact the screw head 376, as shown in FIG. 27. Alternatively, as shown in FIG. 28 an intervening washer 422 may be provided between the screw head 376 of the screw 442, and the raised portion 420 of the cam 340.

Figure 30:
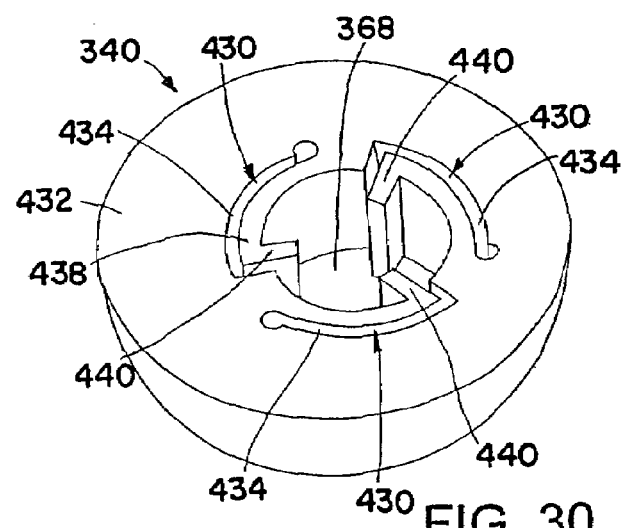
FIG. 30 is a top oblique view of an alternate embodiment cam for use in optical mountings of the present invention.
Figure 31:
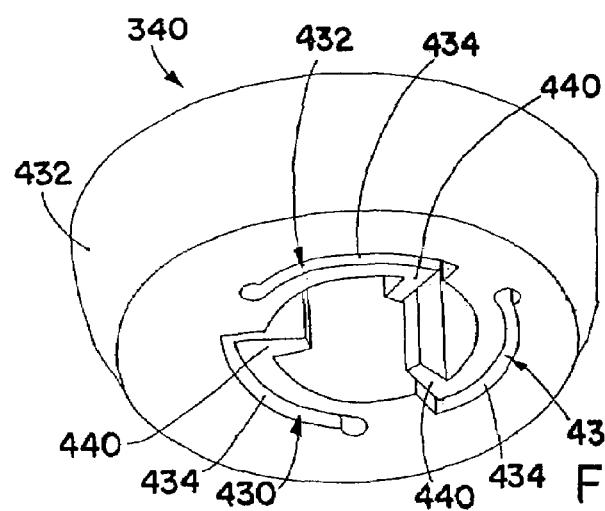
FIG. 31 is a bottom oblique view of the cam of FIG. 30.
Figure 32:
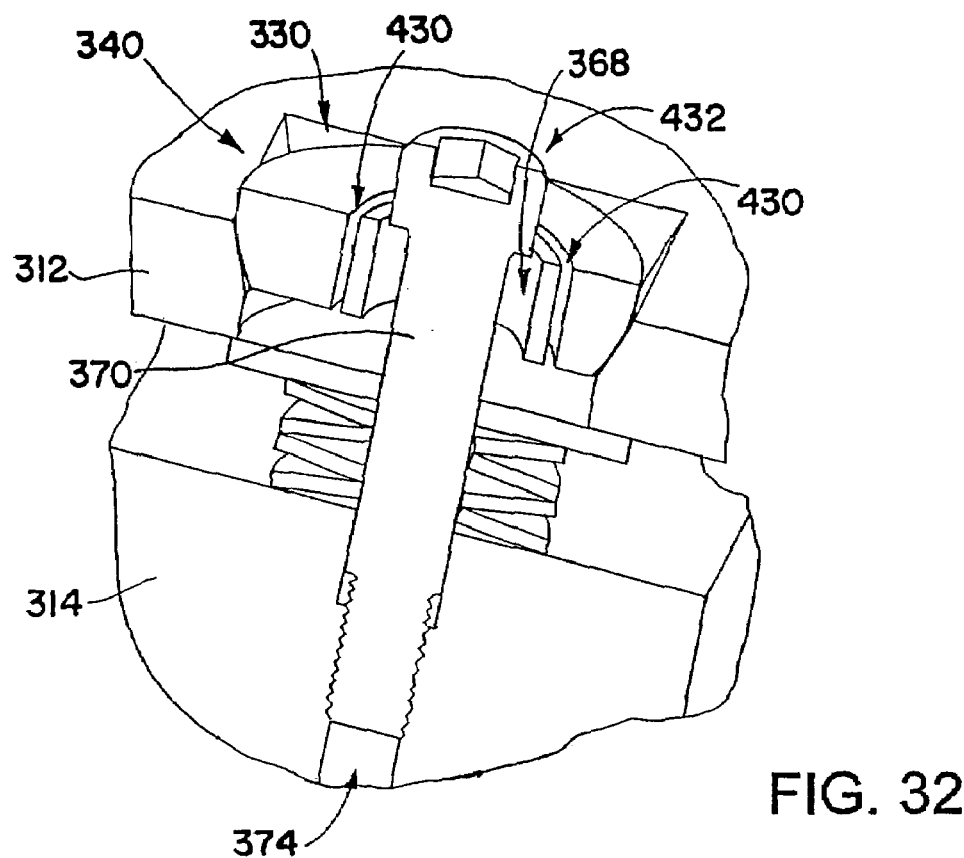
FIG. 32 is a partially cutaway oblique view showing an optical mounting utilizing the cam of FIGS. 30 and 31.

FIGS. 30 and 31 show another alternate embodiment of the cam 340. The embodiment of the cam 340 shown in FIGS. 30 and 31 includes multiple cam flexures 430 about the central hole 368. The cam flexures 430 are partially separated from the main body 432 of the cam 340 by a series of slots 434. The slots 434 are substantially circumferential in direction, leaving cantilevered portions 438 of the cam flexures 430 free to flex in a radial direction. At distal free ends of the cantilever portions 438, the cam flexures 430 include contact portions 440. The contact portions 440 may be substantial radial in orientation, and are configured to contact the screw shaft 370 of the screw 342 placed within the central hole 368, as illustrated in FIG. 32. The use of the cam flexures 430 allows the screw shaft 370 of the screw 342 to be placed through the cam 340 without any clearance between the screw shaft 370 and the cam central hole 368.

Figure 33:
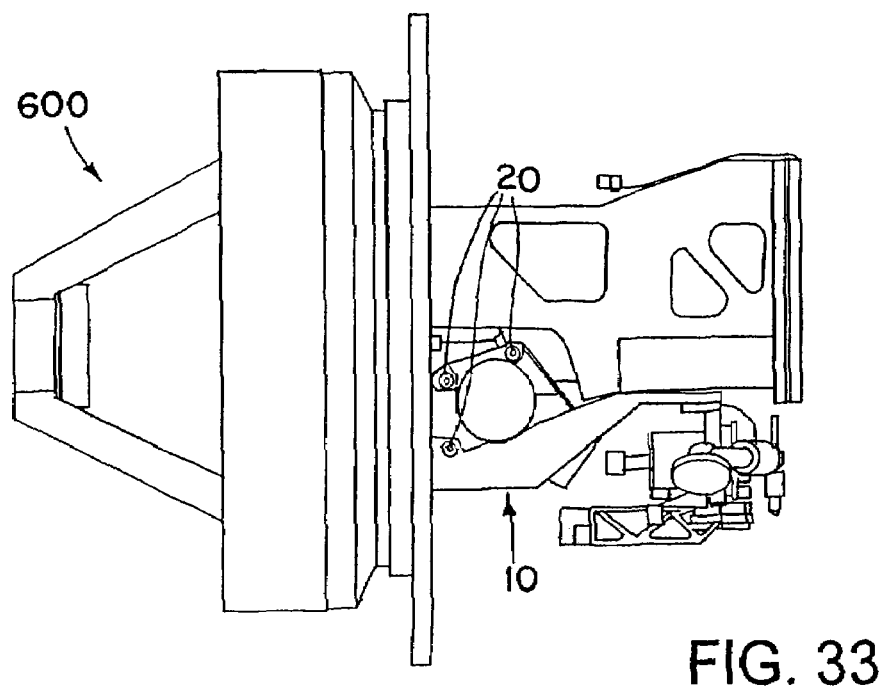
FIG. 33 is an oblique view of an optical mounting in accordance with the present invention utilized as part of an optical system.

FIG. 33 shows the optical mounting 10 as part of an optical system 600. The optical mounting 10 includes all the various embodiment optical mountings disclosed herein. The adjusters 20 of the optical mounting 10 may be used to adjust an optical device that is in a light path for light received by the optical system 600. As an example, the optical mounting 10 may be used to hold a lens to adjust focus of a telescope. However, it will be appreciated that the optical mounting 10 may be utilized in positioning other types of optical devices. Other optical elements that may be coupled to the optical mounting include infrared detectors and physical light detectors.

Further, it will be appreciated that various embodiments of optical mountings disclosed herein may be utilized for other purposes, such as for precision location and mounting of non-optical devices.

The various optical mountings described herein provide a compact and easy to operate way of adjusting position of an optical device. Unlike certain prior systems, the optical mounting disclosed herein are compact enough to be utilized in a limited volume, such as within a missile. Also unlike certain prior devices, the optical mountings disclosed herein may be adjusted without a need to even partially disassemble an optical system that they are part of. The system is configured so that the various adjustable portions of the adjusters, such as the cams, screws, bolts, or nuts, may be easily reached and rotated with the optical mounting installed in the system, and with an optical device coupled to the optical mounting. It will be appreciated that the optical mountings disclosed herein provide a way of achieving fast and accurate adjustments of optical systems.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An adjustable optical mounting comprising:
a base;
a support configured to receive at least one optical device; and
plural adjusters having respective cams that include eccentric cam surfaces that are mechanically coupled to the support;
wherein each of the adjusters are used to adjust the support relative to the base in two directions without any disassembly of the mounting, by rotation of two independent parts of the adjuster, wherein one of the independent parts includes the cam of the adjuster.

2. The mounting of claim 1, wherein rotation of the cams causes translation of the support relative to the base.

3. The mounting of claim 2, wherein the cam surfaces bear against walls of slots in the support.

4. The mounting of claim 3, wherein the walls that the cam surfaces bear against include sloped walls.

5. The mounting of claim 4, wherein the cam surfaces are curved in a direction of axes of the adjusters.

6. The mounting of claim 5, wherein the cam surfaces are substantially spherical.

7. The mounting of claim 1, wherein the cams have cam slots, in a surface thereof, that are configured for receiving a tool to turn the cams.

8. The mounting of claim 1, wherein the support is a frame.

9. The mounting of claim 1, wherein the support is a platform.

10. The mounting of claim 1,
wherein for each of the adjusters the other of the independent parts includes a threaded fastener; and
wherein the threaded fasteners are mechanically coupled to the base and the support.

11. The mounting of claim 10, wherein the adjusters also include respective resilient devices that are mechanically coupled to the base and the support, and that are configured to adjust the height of parts of the support, relative to the base.

12. The mounting of claim 1, wherein for each of the adjusters the two independent parts rotate about a common axis.

13. The mounting of claim 1, wherein the adjustable mounting is part of system run at cryogenic temperature, whereby the independent parts are rotatable while the system is at cryogenic temperature.

14. The optical mounting of claim 1, wherein for each of the adjusters the two independent parts are mechanically coupled together.

15. The optical mounting of claim 14, wherein for each of the adjusters part of one of the independent parts is in an opening in the other of the independent parts.

16. The optical mounting of claim 1, wherein for each of the adjusters rotation of individual of the independent parts corresponds to adjustment in respective of the directions.

17. The optical mounting of claim 1, wherein the two directions are orthogonal directions.

18. The optical mounting of claim 1,
wherein the two directions include one direction which is a height of parts of the support, relative to the base, and another direction which is substantially parallel to the base;
wherein the other of the independent parts include respective threaded fasteners, and further including respective resilient devices that are mechanically coupled to the base and the support; and
wherein the threaded fasteners and the resilient devices are configured to adjust the height of the parts of the support, relative to the base, with the resilient devices providing a spring force that pushes the support away from the base, in opposition to the threaded fasteners.

19. The adjustable mounting of claim 18, wherein rotation of the cams causes translation of the support in the another direction, substantially parallel to the base.

20. The optical mounting of claim 1, wherein the two directions include one direction which is a height of parts of the support, relative to the base, and another direction which is substantially parallel to the base.

21. An adjustable optical mounting comprising:
a base;
a support configured to receive at least one optical device; and
plural adjusters having respective cams that include eccentric cam surfaces that are mechanically coupled to the support;
wherein rotation of the cams causes translation of the support relative to the base; and
wherein the adjusters also include respective threaded fasteners and respective resilient devices that are mechanically coupled to the base and the support, and that are configured to adjust the height of parts of the support, relative to the base.

22. The mounting of claim 21, wherein the threaded fasteners adjustably engage threaded base holes in the base.

23. The mounting of claim 21, wherein the threaded fasteners include threaded members that engage posts that are secured in base holes in the base.

24. The mounting of claim 23, wherein the posts are press fit into the base holes.

25. The mounting of claim 23, wherein the base holes are internally threaded, and wherein the posts are threadedly secured in the base holes.

26. The mounting of claim 23, wherein the threaded members are screws that adjustably threadedly engage internally threaded holes in the posts.

27. The mounting of claim 23, wherein the threaded members are nuts that adjustably threadedly engage externally threaded portions of the posts.

28. The mounting of claim 21, wherein the threaded fasteners pass through respective central holes in the cams.

29. The mounting of claim 28, further comprising resilient flexures that reduce tolerances in location of the adjusters.

30. The mounting of claim 29, wherein the resilient flexures are parts of the cams.

31. The mounting of claim 30, wherein the resilient flexures are in contact with the resilient devices.

32. The mounting of claim 30, wherein the resilient flexures are in contact with the threaded fasteners.

33. The mounting of claim 32, wherein resilient flexures are cantilever flexures separated from other parts of cam heads of the cams by substantially radial slots in the cam heads.

34. The mounting of claim 29, wherein the resilient flexures are parts of posts secured in base holes in the base.

35. The mounting of claim 34, wherein the resilient flexures engage inner surfaces of the cams.

36. The mounting of claim 21, wherein the resilient devices include stacks of disk springs.

37. The mounting of claim 21, wherein the resilient devices include cantilever flexures that are parts of the base.

38. The mounting of claim 21, wherein the resilient devices are between the cams and the base.

39. An adjustable optical mounting that is part of a system, the adjustable optical mounting comprising:
   a base;
   a support configured to receive at least one optical device; and
   plural adjusters for adjusting the support relative to the base while the system is within a cryogenic temperature environment;
   wherein each of the adjusters are used to adjust the support relative to the base in at least two orthogonal directions.

40. The mounting of claim 39,
   wherein the adjusters each have respective cams that include eccentric cam surfaces that are mechanically coupled to the support.

41. The optical mounting of claim 39, wherein the two directions include one direction which is a height of parts of the support, relative to the base, and another direction which is substantially parallel to the base.

* * * * *

UNITED STATES PATENT AND TRADEMARK OFFICE
CERTIFICATE OF CORRECTION

| | |
|---|---|
| PATENT NO. | : 7,599,138 B2 |
| APPLICATION NO. | : 10/968609 |
| DATED | : October 6, 2009 |
| INVENTOR(S) | : Theriault et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 907 days.

Signed and Sealed this

Twenty-eighth Day of September, 2010

David J. Kappos
*Director of the United States Patent and Trademark Office*